US010220469B2

(12) United States Patent
Yamashita et al.

(10) Patent No.: US 10,220,469 B2
(45) Date of Patent: Mar. 5, 2019

(54) COMBINED MACHINING APPARATUS AND COMBINED MACHINING METHOD

(71) Applicant: MITSUBISHI HEAVY INDUSTRIES, LTD., Tokyo (JP)

(72) Inventors: Tsugumaru Yamashita, Tokyo (JP); Yoshihito Fujita, Tokyo (JP); Kiyotaka Nakagawa, Tokyo (JP); Shinnosuke Osafune, Tokyo (JP); Haruhiko Niitani, Tokyo (JP); Yoshikatsu Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 399 days.

(21) Appl. No.: 14/914,795

(22) PCT Filed: May 23, 2014

(86) PCT No.: PCT/JP2014/063745
§ 371 (c)(1),
(2) Date: Feb. 26, 2016

(87) PCT Pub. No.: WO2015/029515
PCT Pub. Date: Mar. 5, 2015

(65) Prior Publication Data
US 2016/0221118 A1 Aug. 4, 2016

(30) Foreign Application Priority Data

Sep. 2, 2013 (JP) .................................. 2013-181362

(51) Int. Cl.
*B23K 26/00* (2014.01)
*B23P 23/04* (2006.01)
(Continued)

(52) U.S. Cl.
CPC ...... *B23K 26/0093* (2013.01); *B23K 26/0608* (2013.01); *B23K 26/0624* (2015.10);
(Continued)

(58) Field of Classification Search
CPC ............ B23K 26/0093; B23K 26/0608; B23K 26/0624; B23K 26/0652; B23K 26/083;
(Continued)

(56) References Cited

U.S. PATENT DOCUMENTS 4,335,296 A * 6/1982 Bredow ............. B23K 26/0853
219/121.67
5,010,232 A * 4/1991 Arai .................... B23K 26/0093
219/121.67

(Continued)

FOREIGN PATENT DOCUMENTS

CN 2920517 Y 7/2007
CN 101104239 A 1/2008
(Continued)

OTHER PUBLICATIONS

International Search Report, issued in PCT/JP2014/063745, dated Jul. 8, 2014.
(Continued)

*Primary Examiner* — Jacob J Cigna
(74) *Attorney, Agent, or Firm* — Birch, Stewart, Kolasch & Birch, LLP

(57) ABSTRACT

Provided are a combined machining apparatus and a combined machining method capable of performing machining with higher accuracy and at a high speed. The apparatus has a stage unit; a mechanical machining unit including a mechanical machining head having a tool configured to machine a workpiece; a laser machining unit including a laser machining head configured to emit laser for machining the workpiece; a moving unit; and a control unit that controls
(Continued)

the operation of each unit, in which the laser machining head has a laser turning unit that turns laser relative to the workpiece, and a condensing optical system that focuses the laser turned by the laser turning unit, and a position at which the workpiece is irradiated with the laser is rotated by the laser turning unit.

9 Claims, 13 Drawing Sheets

(51) Int. Cl.
- *F02M 61/16* (2006.01)
- *B23K 37/02* (2006.01)
- *B23K 26/06* (2014.01)
- *B23K 26/08* (2014.01)
- *B23K 26/0622* (2014.01)
- *B23K 26/382* (2014.01)

(52) U.S. Cl.
CPC ........ *B23K 26/0652* (2013.01); *B23K 26/083* (2013.01); *B23K 26/0869* (2013.01); *B23K 26/389* (2015.10); *B23K 37/0235* (2013.01); *B23P 23/04* (2013.01); *F02M 61/168* (2013.01); *F02M 2200/8069* (2013.01)

(58) Field of Classification Search
CPC .............. B23K 26/0869; B23K 26/389; B23K 37/0235; B23P 23/04; F02M 61/168; F02M 2200/8069
See application file for complete search history.

(56) References Cited

U.S. PATENT DOCUMENTS

| | | | | |
|---|---|---|---|---|
| 6,337,464 | B1* | 1/2002 | Takaoka | B23K 26/0093 219/121.65 |
| 6,378,792 | B2* | 4/2002 | Fukaya | F02M 61/168 239/533.12 |
| 6,666,630 | B2* | 12/2003 | Zimmermann | B23C 3/00 219/121.6 |
| 8,604,381 | B1* | 12/2013 | Shin | B23K 26/34 219/121.64 |
| 2002/0008166 | A1* | 1/2002 | Fukaya | F02M 61/168 239/533.12 |
| 2006/0065648 | A1* | 3/2006 | Kameyama | B23K 26/0093 219/121.71 |
| 2006/0223686 | A1* | 10/2006 | Wakazono | B23K 26/0093 483/1 |
| 2007/0271757 | A1* | 11/2007 | Nagahama | B23K 26/0093 29/33 R |
| 2008/0221725 | A1* | 9/2008 | Wakazono | B23K 26/0093 700/179 |
| 2010/0326138 | A1 | 12/2010 | Kumatani et al. | |

FOREIGN PATENT DOCUMENTS

| | | |
|---|---|---|
| JP | 52-019795 U1 | 7/1975 |
| JP | 1-266983 A | 10/1989 |
| JP | 5-104365 A | 4/1993 |
| JP | 6-328352 A | 11/1994 |
| JP | 8-99242 A | 4/1996 |
| JP | 10-314973 A | 12/1998 |
| JP | 2000-33490 A | 2/2000 |
| JP | 2000-202667 A | 7/2000 |
| JP | 3140510 B2 | 12/2000 |
| JP | 2002-178186 A | 6/2002 |
| JP | 2007-83285 A | 4/2007 |
| JP | 2008-200761 A | 9/2008 |
| JP | 2009-50869 A | 3/2009 |
| JP | 2011-11917 A | 1/2011 |
| JP | 4721844 B2 | 4/2011 |

OTHER PUBLICATIONS

Written Opinion of the International Searching Authority, issued in PCT/JP2014/063745(PCT/ISA/237), dated Jul. 8, 2014.
Office Action dated Aug. 3, 2016 in corresponding Chinese Application No. 201480047019.X with an English Translation.
Decision of Refusal dated Jul. 11, 2017 in corresponding Japanese Patent Application No. 2013-181362 with a Machine English Translation.
Office Action dated Apr. 25, 2017 in corresponding Japanese Patent Application No. 2013-181362 with a Machine English Translation.
Extended European Search Report dated Mar. 17, 2017 in corresponding EP Application No. 14 839 095.8.

* cited by examiner

COMBINED MACHINING APPARATUS AND COMBINED MACHINING METHOD

FIELD

The present invention relates to a combined machining method and a combined machining apparatus that perform combined machining using both heads by a laser machining head and a mechanical machining head.

BACKGROUND

Conventionally, for example, a combined machining apparatus (combined machine) disclosed in Patent Literature 1 selectively performs laser machining or mechanical machining on a workpiece. Specifically, the combined machining apparatus is equipped with a laser machining head that emits a laser beam for machining a workpiece by the use of a side pump type fiber laser for exciting the laser by making the laser incident from a side surface of an optical fiber, a mechanical machining head having a spindle on which a tool for cutting or polishing a workpiece is mounted, a head stock that fixes both heads so that an optical axis of the laser beam of the laser machining head and the spindle of the mechanical machining head are parallel to each other and to prevent relative movement between both heads, a table that mounts the workpiece and is provided to be relatively moved between the workpiece and the head stock, and a measuring unit that performs focal alignment of the laser beam of the laser machining head and measurement of geometry of the workpiece, the measuring unit having a current position detection device that detects a current position of the relative movement of X, Y and Z-axes between the head stock and the table, and a CCD camera that captures the reflected light from the workpiece surface of the measurement light beam projected to pass through the same condenser lens as the laser beam of the laser machining head, and it is possible to switch the laser machining and the mechanical machining, depending on whether the tool is mounted on the spindle of the mechanical machining head to turn the output of the laser beam of the laser machining head OFF or the tool is detached from the spindle to turn the output of the laser beam ON.

The combined machining apparatus described in Patent Literature 1 has the following effects. The switching between the laser machining and the mechanical machining can be rapidly performed by attachment and detachment of the tool to the spindle of the mechanical machining head or ON and OFF of the output of the laser beam of the laser machining head. Further, since there is no deflection of the optical axis even without performing the optical axis centering of the laser beam at the time of switching, the laser machining can be immediately initiated, and machine utilization rate rises. Furthermore, the absence of the deflection of the optical axis means that mechanical machining is performed with high accuracy, and in particular, it is suitable for micro mechanical machining. Further, by appropriately setting a positional relation in the Z-axis direction between the laser machining head and the mechanical machining head, and a positional relation in the X-Y plane, the workpiece does not collide with the laser machining head or the mechanical machining head during the laser machining or the mechanical machining.

CITATION LIST

Patent Literature

Patent Literature 1: Japanese Patent No. 4721844

SUMMARY

Technical Problem

The combined machining apparatus described in Patent Literature 1 described above is based on the assumption that the laser machining and the mechanical machining are switched, and an increase in speed of the machining is achieved by quickly performing the switching. Here, in the combined machining apparatus, there is a need to machine the workpiece with higher accuracy and at a high speed.

The present invention has been made to solve the above-described problems, and an object thereof is to provide a combined machining apparatus and a combined machining method capable of machining a workpiece with high accuracy and at a high speed.

Solution to Problem

According to an aspect of the present invention, a combined machining apparatus comprises: a stage unit that includes a stage configured to support a workpiece; a mechanical machining unit that includes a mechanical machining head having a tool configured to machine the workpiece; a laser machining unit that includes a laser machining head configured to emit laser for machining the workpiece; a moving unit that includes a Y-axis moving mechanism, a first X-axis moving mechanism, a second X-axis moving mechanism, a first Z-axis moving mechanism and a second Z-axis moving mechanism, the Y-axis moving mechanism relatively moving the laser machining head, the mechanical machining head and the stage in a Y-axis direction, the first X-axis moving mechanism being fixed to the Y-axis moving mechanism to relatively move the mechanical machining head in an X-axis direction orthogonal to the Y-axis direction, the second X-axis moving mechanism being fixed to the Y-axis moving mechanism to relatively move the laser machining head in the X-axis direction, the first Z-axis moving mechanism being fixed to the first X-axis moving mechanism to relatively move the mechanical machining head in a Z-axis direction orthogonal to the Y-axis direction and the X-axis direction, and the second Z-axis moving mechanism being fixed to the second X-axis moving mechanism to relatively move the laser machining head in the Z-axis direction; and a control unit that controls the operation of each unit. The laser machining head has a laser turning unit that turns the laser relative to the workpiece, and a condensing optical system that condenses the laser turned by the laser turning unit, and a position at which the workpiece is irradiated with the laser is rotated by the laser turning unit.

Advantageously, in the combined machining apparatus, the first X-axis moving mechanism moves along the same guide member as the second X-axis moving mechanism.

Advantageously, in the combined machining apparatus, the mechanical machining unit has a tool exchange unit that holds at least one tool in a movement area of the mechanical machining head, and the control unit moves the mechanical machining head to a position facing the tool exchange unit using the first X-axis moving mechanism and the first Z-axis moving mechanism, and exchanges the tool mounted on the mechanical machining head using the tool exchange unit.

Advantageously, in the combined machining apparatus, the stage unit further has a stage moving mechanism that moves the stage, and the control unit changes the posture of the workpiece by the stage moving mechanism.

Advantageously, in the combined machining apparatus, the stage moving mechanism includes at least one mechanism that rotates the stage around orthogonal two axes.

Advantageously, in the combined machining apparatus, the mechanical machining unit includes at least one tool that polishes the workpiece, and the mechanical machining head polishes the workpiece by rotating the tool that polishes the workpiece.

Advantageously, in the combined machining apparatus, the laser machining unit includes a fiber laser beam source that outputs a fiber laser, a pulse laser beam source that outputs a pulse laser, and a switching mechanism that switches a state of making the fiber laser incident on the laser turning unit, and a state of making the pulse laser incident on the laser turning unit.

According to another aspect of the present invention, a combined machining method for machining a workpiece, using a mechanical machining head having a tool configured to machine the workpiece, and a laser machining head configured to emit laser for machining the workpiece, the method comprises: laser machining the workpiece by irradiating the workpiece with laser, after adjusting the posture of the workpiece; moving the laser machining head and the mechanical machining head and moving the mechanical machining head to a position of machining the workpiece; and mechanically machining the workpiece, after adjusting the posture of the workpiece.

Advantageously, in the combined machining method, the workpiece is a nozzle body of an injector, an injection hole of the nozzle body is formed in the laser machining, and an internal surface of the nozzle body is polished in the mechanical machining.

Advantageous Effects of Invention

According to the combined machining apparatus and the combined machining method of the present invention, it is possible to independently perform the laser machining and the mechanical machining on a workpiece held on a stage. Thus, there are effects capable of continuously performing the laser machining and the mechanical machining, while holding the workpiece, and capable of performing the machining with high accuracy and at a high speed.

DESCRIPTION OF EMBODIMENTS

Modes (embodiments) for carrying out the present invention will be described in detail with reference to the drawings. The present invention is not limited by the contents described in the following embodiments. Further, constituent elements described below include elements that can be easily replaced by those skilled in the art or the substantially same elements. Furthermore, the configurations described below can be appropriately combined with each other. Moreover, it is possible to perform various omissions, replacements or changes of the configurations without departing from the scope of the present invention.

Figure 1:
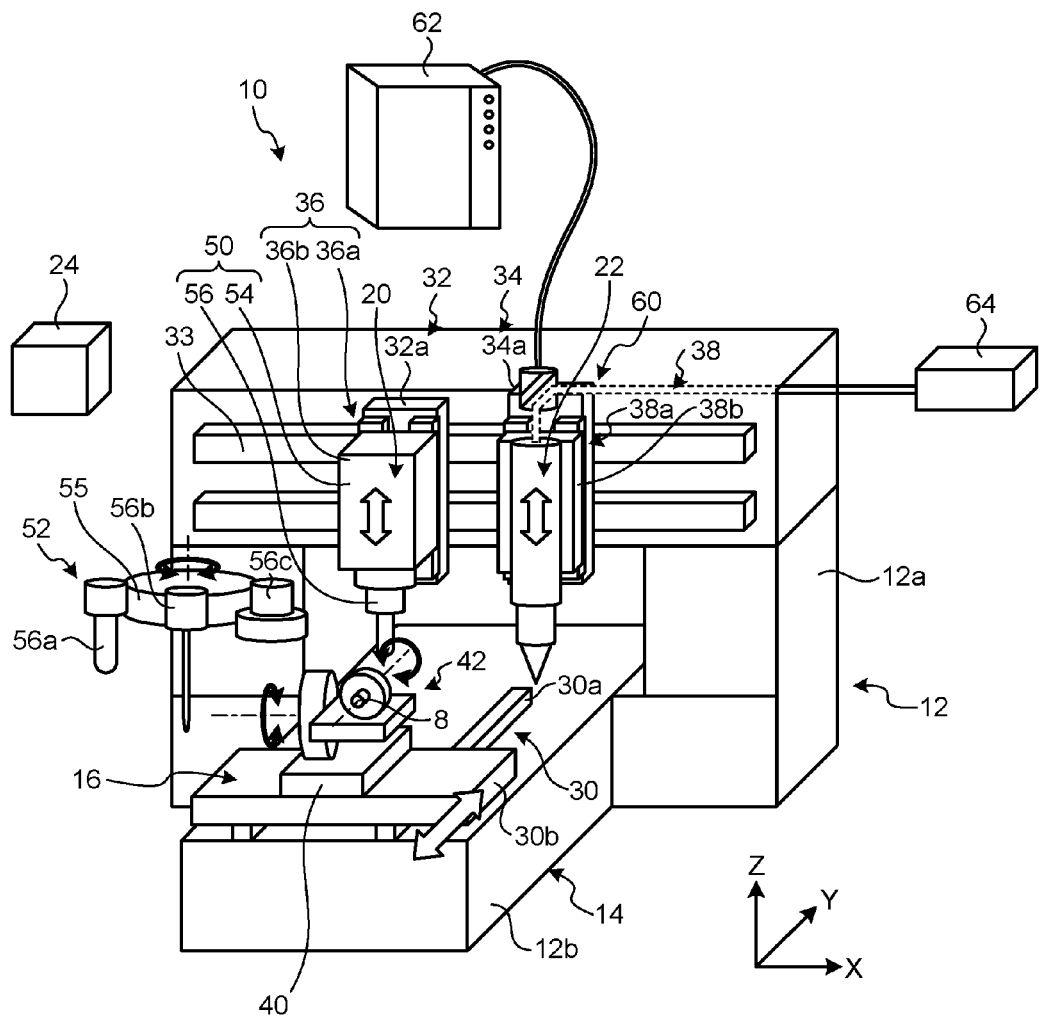
FIG. 1 is a schematic diagram illustrating a schematic configuration of a combined machining apparatus according to this embodiment.
Figure 2:
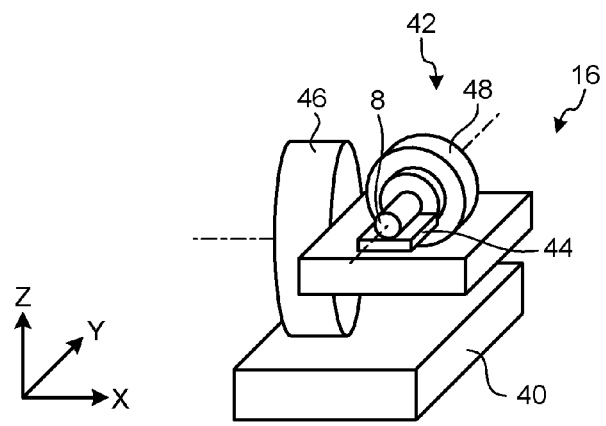
FIG. 2 is a perspective view illustrating a schematic configuration of a stage unit.
Figure 3:
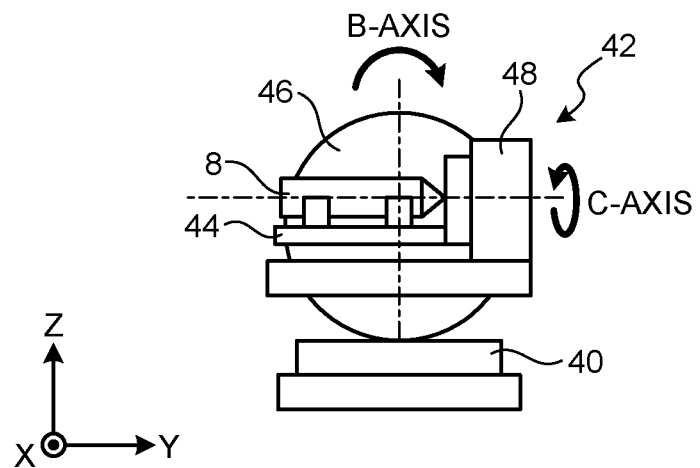
FIG. 3 is a front view illustrating a schematic configuration of the stage unit.
Figure 4:
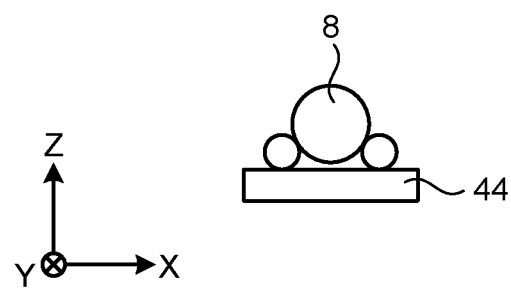
FIG. 4 is a side view illustrating a schematic configuration of a stage and a workpiece.
Figure 5:
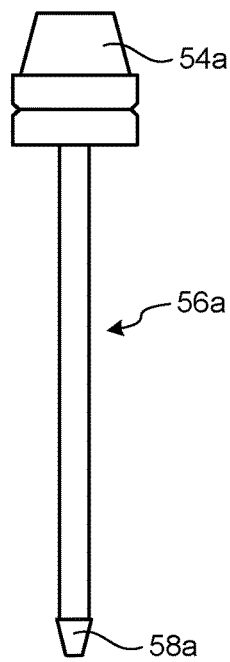
FIG. 5 is an explanatory diagram illustrating an example of a tool.
Figure 6:
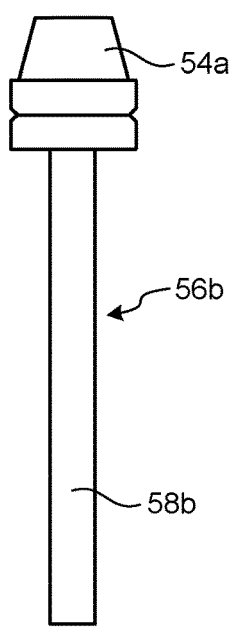
FIG. 6 is an explanatory diagram illustrating an example of a tool.
Figure 7:
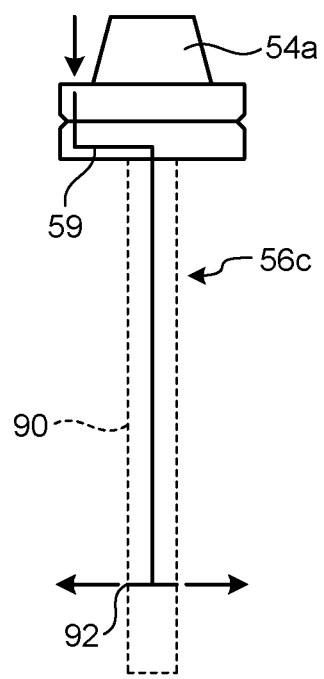
FIG. 7 is an explanatory diagram illustrating an example of a tool.
Figure 8:
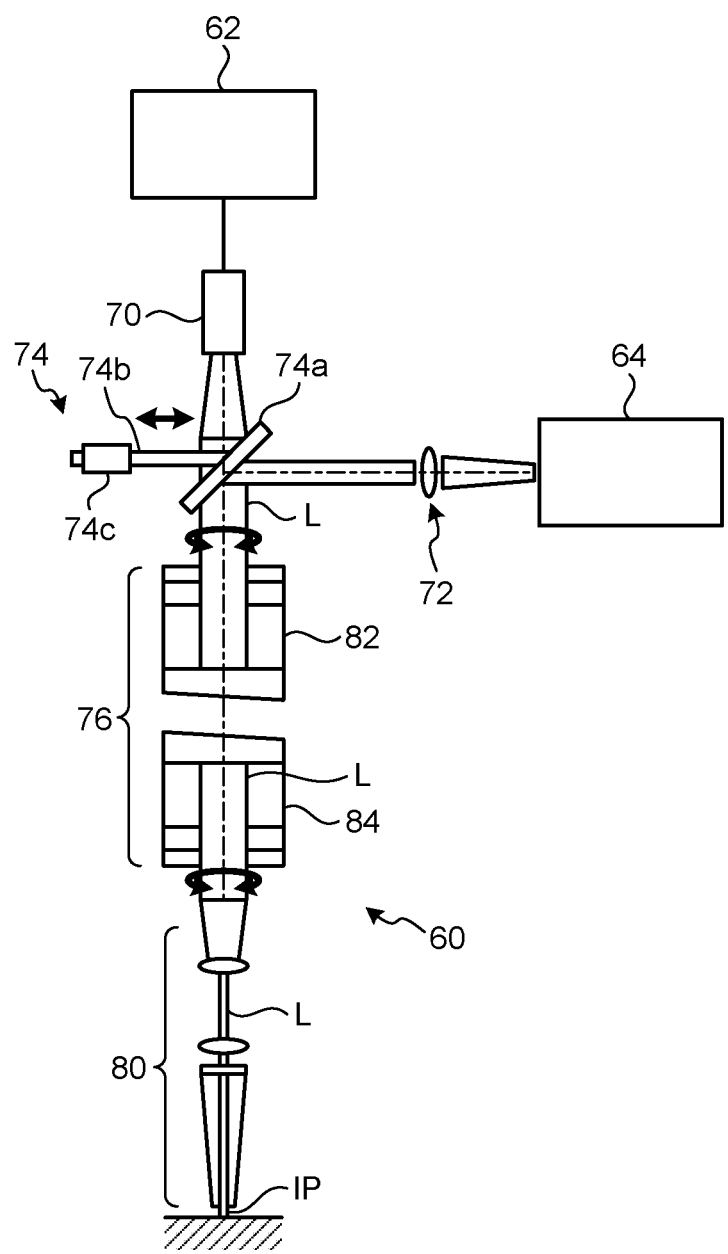
FIG. 8 is a schematic diagram illustrating a schematic configuration of a laser machining head.

FIG. 1 is a schematic diagram illustrating a schematic configuration of a combined machining apparatus according to this embodiment. FIG. 2 is a perspective view illustrating a schematic configuration of a stage unit. FIG. 3 is a front view illustrating a schematic configuration of the stage unit. FIG. 4 is a side view illustrating a schematic configuration of a stage and a workpiece. FIGS. 5 to 7 are explanatory diagrams illustrating an example of a tool. FIG. 8 is a schematic diagram illustrating a schematic configuration of a laser machining head.

As illustrated in FIG. 1, a combined machining apparatus 10 is an apparatus that performs various types of machining, such as cutting, drilling, welding, cladding, surface-reforming, surface-finishing, laser-laminated molding and polishing, on a workpiece 8. Further, although the kinds of machining are not particularly limited, the combined machining apparatus 10 of this embodiment performs polishing and drilling. The combined machining apparatus 10 also performs the measurement of the workpiece 8.

The combined machining apparatus 10 has a frame 12, a moving unit 14, a stage unit 16, a mechanical machining unit 20 including a mechanical machining head 50, a laser machining unit 22 including a laser machining head 60, and a control unit 24. The combined machining apparatus 10 performs mechanical machining of the workpiece 8 held on the stage unit 16 using the mechanical machining unit 20.

Further, the combined machining apparatus 10 irradiates the workpiece 8 held on the stage unit 16 with laser using the laser machining unit 22, thereby performing the laser machining of the workpiece 8. In this embodiment, a horizontal plane is assumed as an X-Y plane including an X-axis direction and a Y-axis direction orthogonal to the X-axis, and a direction orthogonal to the horizontal plane is assumed as a Z-axis direction.

The frame 12 is a housing of the combined machining apparatus 10, and is fixed onto an installation surface such as a ground or a base. The frame 12 has a gate 12a and a base 12b which is inserted into a space in the gate 12a. A fixed part of the moving unit 14 is fixed to the frame 12. The combined machining apparatus 10 is a so-called portal machining apparatus in which the moving unit 14 is fixed to the gates 12a and the base 12b of the frame 12, thereby relatively moving the workpiece 8, the mechanical machining unit 20 and the laser machining unit 22 using the moving unit 14.

The moving unit 14 relatively moves the workpiece 8 and the mechanical machining head 50, and relatively moves the workpiece 8 and the laser machining head 60. The moving unit 14 has a Y-axis moving mechanism 30, a first X-axis moving mechanism 32, a second X-axis moving mechanism 34, a first Z-axis moving mechanism 36 and a second Z-axis moving mechanism 38. The Y-axis moving mechanism 30 has a rail 30a that is disposed on the base 12b of the frame 12 and extends in the Y-axis direction, and a Y-axis moving member 30b that moves along the rail 30a. In the Y-axis moving mechanism 30, the stage unit 16 is fixed to the Y-axis moving member 30b. The Y-axis moving mechanism 30 moves the stage unit 16 in the Y-axis direction by moving the Y-axis moving member 30b along the rail 30a. The Y-axis moving mechanism 30 may use a variety of mechanisms, as a mechanism that moves the Y-axis moving member 30b in the Y-axis direction. For example, it is possible to use a mechanism that inserts a ball screw into the Y-axis moving member 30b and rotates the ball screw using a motor or the like, a linear motor mechanism, a belt mechanism or the like. The first X-axis moving mechanism 32, the second X-axis moving mechanism 34, the first Z-axis moving mechanism 36 and the second Z-axis moving mechanism 38 can also similarly use a variety of mechanisms.

The first X-axis moving mechanism 32 has a rail 33 that is disposed on the gate 12a of the frame 12 and extends in the X-axis direction, and an X-axis moving member 32a that moves along the rail 33. In the first X-axis moving mechanism 32, the first Z-axis moving mechanism 36 is fixed to the X-axis moving member 32a. The first X-axis moving mechanism 32 moves the first Z-axis moving mechanism 36 in the X-axis direction by moving the X-axis moving member 32a along the rail 33. The second X-axis moving mechanism 34 has a rail 33 that is disposed on the gate 12a of the frame 12 and extends in the X-axis direction, and an X-axis moving member 34a that moves along the rail 33. The rail 33 is a rail that is common to the rail 33 of the first X-axis moving mechanism 32. In the second X-axis moving mechanism 34, the second Z-axis moving mechanism 38 is fixed to the X-axis moving member 34a. The second X-axis moving mechanism 34 moves the second Z-axis moving mechanism 38 in the X-axis direction by moving the X-axis moving member 34a along the rail 33. The first Z-axis moving mechanism 36 has a rail 36a that is fixed to the X-axis moving member 32a and extends in the Z-axis direction, and a Z-axis moving member 36b that moves along the rail 36a. In the first Z-axis moving mechanism 36, the mechanical machining head 50 is fixed to the Z-axis moving member 36b. The first Z-axis moving mechanism 36 moves the mechanical machining head 50 in the Z-axis direction by moving the Z-axis moving member 36b along the rail 36a. The second Z-axis moving mechanism 38 has a rail 38a that is fixed to the X-axis moving member 34a and extends in the Z-axis direction, and a Z-axis moving member 38b that moves along the rail 38a. In the second Z-axis moving mechanism 38, the laser machining head 60 is fixed to the Z-axis moving member 38b. The second Z-axis moving mechanism 38 moves the laser machining head 60 in the Z-axis direction by moving the Z-axis moving member 38b along the rail 38a.

The moving unit 14 relatively moves the workpiece 8 and the mechanical machining head 50 in each of the X-axis, Y-axis and Z-axis directions by the use of the Y-axis moving mechanism 30, the first X-axis moving mechanism 32 and the first Z-axis moving mechanism 36, and relatively moves the workpiece 8 and the laser machining head 60 in each of the X-axis, Y-axis and Z-axis directions by the use of the Y-axis moving mechanism 30, the second X-axis moving mechanism 34 and the second Z-axis moving mechanism 38.

The stage unit 16 is disposed on the Y-axis moving member 30b of the Y-axis moving mechanism 30. The stage unit 16 has a support base 40, a stage moving mechanism 42 and a stage 44. The support base 40 is a plate-like member fixed to the Y-axis moving member 30b, and supports the stage moving mechanism 42. The stage moving mechanism 42 is fixed on the support base 40 to move the stage 44 relative to the support base 40. As illustrated in FIGS. 2 and 3, the stage moving mechanism 42 has a B-axis rotating mechanism 46 and a C-axis rotating mechanism 48. The B-axis rotating mechanism 46 is fixed to the support base 40 to rotate the C-axis rotating mechanism 48 relative to the support base 40 about the B-axis. Here, the B-axis is an axis that coincides with the X-axis. The C-axis rotating mechanism 48 is fixed to the B-axis rotating mechanism 46 to rotate the stage 44 relative to the B-axis rotating mechanism 46 about the C-axis. Here, the C-axis is an axial direction that is orthogonal to the B-axis, that is, the X-axis. The stage moving mechanism 42 can rotate the stage 44 around each of the two axes that are orthogonal to the support base 40. The stage 44 is a mechanism that supports the workpiece 8. As illustrated in FIG. 4, on the stage 44 of this embodiment, the workpiece 8 is fixed to the plate-like member. The stage 44 is fixed to the plate-like member, a roller is provided in contact with the workpiece 8, and the roller suppresses rotation of the workpiece 8. The stage unit 16 is set on the Y-axis moving mechanism 30 to fix the workpiece 8 on the stage 44. Further, the stage unit 16 adjusts the direction, that is, the posture of the workpiece 8, by rotating the stage 44 using the stage moving mechanism 42.

The mechanical machining unit 20 has a mechanical machining head 50 and a tool exchange unit 52. The mechanical machining head 50 is a mechanism that performs the mechanical machining of the workpiece 8, and has a head main body 54, and a tool 56 that is detachably attached to the head main body 54. The mechanical machining head 50 rotates or vibrates the tool 56 by the head main body 54 in a state in which the tool 56 is brought into contact with the workpiece 8, thereby machining of the workpiece 8. The mechanical machining head 50 can also perform the measurement of the workpiece 8 by mounting a measuring tool on the head main body 54. The tool exchange unit 52 has a support portion 55 provided with a plurality of support mechanisms for supporting the tool, and the support portion 55 supports a plurality of tools 56a, 56b and 56c. As illustrated in FIG. 5, the tool 56a is an elongated rod-like member and is a tool provided with a grinding wheel surface 58a in a part of the tip. One end portion of the tool 56a is attached to a joint portion 54a of the head main body 54 in use, as illustrated in FIG. 5. As illustrated in FIG. 6, the tool 56b is an elongated rod-like member and is a tool provided with a grinding wheel surface 58b on the side surface. As illustrated in FIG. 7, the tool 56c is a measuring tool and is provided with an air passage 59 that supplies air. The mechanical machining unit 20 supplies air from the air passage 59, for example, in a state of sealing a measurement object (which is also a workpiece) 90, and measures a change in an internal pressure generated by air discharged from an opening 92 of the measurement object 90, thereby measuring a volume of an inner space and a diameter of the opening 92, or measuring whether the opening 92 is opened. The tool exchange unit 52 is disposed within a movable range of the mechanical machining head 50. The tool exchange unit 52 detaches the tool 56 from the head main body 54 by holding a tool, which is mounted on the mechanical machining head 50, on the support mechanism in which tool is not disposed of the support mechanisms for supporting the tool of the support portion 55. Further, the tool exchange unit 52 mounts another tool on the head main body 54, by attaching another tool held on the support mechanism to the head main body 54. The mechanical machining unit 20 can perform the machining according to a purpose by switching the tool mounted to the head main body 54 depending on the machining of the workpiece 8. The number of the tools is not particularly limited.

The laser machining unit 22 has a laser machining head 60, a fiber laser beam source 62 and a pulse laser beam source 64. The fiber laser beam source 62 is a device that outputs a laser beam using an optical fiber as a medium. As the fiber laser output device, for example, it is possible to use a Fabry-Perot type fiber laser output device and a ring-type fiber laser output device, and the laser is oscillated by excitation of the these output devices. As fiber of the fiber laser output device, for example, it is possible to use silica glass added with a rare earth element such as erbium (Er), neodymium (Nd) and ytterbium (Yb). The pulse laser beam source 64 outputs the laser with short pulse, for example, at a frequency of 20 kHz. As the pulse laser output device, it is possible to use a titanium-sapphire laser, for example, as a laser oscillation source, and it is possible to oscillate the pulse with a pulse width of 100 picoseconds or less. Further, it is also possible to use a laser such as a YAG laser or a YVO4 laser, which oscillates a nanosecond-order pulse.

Next, the laser machining head 60 will be illustrated. As illustrated in FIG. 8, the fiber laser output from the fiber laser beam source 62 and the pulse laser output from the pulse laser beam source 64 are incident on the laser machining head 60, and by irradiating the workpiece 8 with one of the incident laser, the workpiece 8 is subjected to the laser machining. Further, the fiber laser output from the fiber laser beam source 62 and the pulse laser output from the pulse laser beam source 64 are guided to the laser machining head 60 by an optical member such as an optical fiber that guides the laser beam.

The laser machining head 60 includes collimate optical systems 70 and 72, a switching mechanism 74, a laser turning unit 76 and a condensing optical system 80. The collimate optical system 70 is an optical member that collimates the fiber laser output from the fiber laser beam source 62 and emits the collimated fiber laser toward the switching mechanism 74. The collimate optical system 72 is an optical member that collimates the pulse laser output from the pulse laser beam source 64, and emits the collimated pulse laser toward the switching mechanism 74.

The switching mechanism 74 is a mechanism that switches whether to cause the fiber laser output from the fiber laser beam source 62 or the pulse laser output from the pulse laser beam source 64 to enter the laser turning unit 76. The switching mechanism 74 has a mirror 74a that reflects the laser, a support rod 74b connected to the mirror 74a and a drive unit 74c that moves the support rod 74b. The switching mechanism 74 disposes the mirror 74a at a position illustrated in FIG. 8, specifically, at a position in which the fiber laser and the pulse laser overlap each other using the drive unit 74c, reflects the pulse laser by the mirror 74a, and blocks the fiber laser, thereby making a state in which the pulse laser is incident on the laser turning unit 76. Further, the switching mechanism 74 places the mirror 74a at a position deviated from the path of the fiber laser using the drive unit 74c and causes the fiber laser to directly pass, thereby making a state in which the fiber laser is incident on the laser turning unit 76. When the fiber laser is allowed to directly pass, the pulse laser may be reflected by the mirror 74a so that the laser is irradiated at a position that absorbs the laser, and the pulse laser may be blocked by providing a shutter between the collimate optical system 72 and the mirror 74a.

The laser turning unit 76 rotates the laser about the center of the optical path to turn an irradiation position IP of the laser irradiated to the workpiece 8, that is, the laser L. As illustrated in FIG. 8, the laser turning unit 76 has a first prism unit 82 and a second prism unit 84.

The first prism unit 82 has a first prism that refracts the laser L to tilt the laser relative to the optical axis, and a rotating mechanism that rotates the first prism. The second prism unit 84 has a second prism that refracts the laser L refracted by the first prism unit 82 again to control the condensing position, and a rotating mechanism that rotates the second prism. As the first prism and the second prism, it is possible to use, for example, a wedge prism.

The laser turning unit 76 rotates the irradiation position IP of the laser L, by rotating the first prism of the first prism unit 82 and the second prism of the second prism unit 84. The laser turning unit 76 can perform the synchronous rotation and the relative rotation of the first prism of the first prism unit 82 and the second prism of the second prism unit 84.

Further, the laser turning unit 76 may be provided with an encoder that detects the relative position and the rotational speed of the first prism and the second prism, and a cooling mechanism that cools the laser turning unit 76. The laser turning unit 76 can vary a difference in phase angle between the first prism and the second prism. Thus, it is possible to make the laser irradiation point eccentric from the center of the optical path of the rotary axis to the irradiation position separated by a distance corresponding to a difference in phase angle between the first prism and the second prism. When synchronously rotating the first prism and the second prism at the same rotational periods, while maintaining a difference in phase angle between the first prism and the second prism, the laser irradiation point draws a circular orbit of the turning diameter. Also, when asynchronously rotating the first prism and the second prism (rotating at different rotational periods), it is possible to turn the laser irradiation point, while increasing or decreasing the turning diameter of the laser irradiation point, and it is also possible to draw an arbitrary curved orbit.

Further, the turning diameter refers to a distance from the center of the optical path to the irradiation position of the laser L irradiated to the workpiece 8, and refers to the radius with which the laser L irradiated to the workpiece 8 turns around the center. Since the turning diameter of the laser L irradiated to the workpiece 8 changes by changing a difference in phase angle between the first prism and the second prism, the turning diameter is variable. The turning speed refers to the number of times per unit time by which the irradiation position of the laser L irradiated to the workpiece 8 turns around the center.

The condensing optical system 80 has a plurality of lenses, condenses the laser L passed through the laser turning unit 76 by the plurality of lenses, and forms laser with a predetermined focal distance and a focal depth. The condensing optical system 80 irradiates the workpiece 8 with the laser L of a predetermined spot diameter. Further, the condensing optical system 80 preferably has a cooling mechanism. The cooling mechanism, for example, is a cooling jacket or the like for cooling the plurality of lenses.

Further, the laser machining head 60 may be provided with an assist gas supply mechanism that supplies the assist gas along the laser L irradiated to the workpiece 8. In this embodiment, as the assist gas, it is possible to use, for example, air, nitrogen gas, oxygen gas, argon gas, xenon gas, helium gas or a mixed gas thereof. When an oxygen gas capable of using the oxidation reaction heat in the machining is used as the assist gas, it is possible to further improve the machining speed of the workpiece 8 such as metal. Moreover, when using nitrogen gas or argon gas for suppressing the generation of the oxide film as a heat-affected layer is used as the assist gas, it is possible to improve the machining accuracy of the workpiece 8 such as metal. The gaseous specie, the mixing ratio and the amount of ejection (pressure) of the assist gas can be varied depending on the machining conditions such as the kind and the machining mode of the workpiece 8. Furthermore, the laser machining unit 22 may be provided with a capturing unit that captures an image of a position irradiated with laser, for example, a charge coupled device (CCD) image sensor or the like. In this way, it is possible to adjust the irradiation position of the laser on the basis of the acquired image.

The control unit 24 controls the operation of each unit of the moving unit 14, the stage unit 16, the mechanical machining unit 20 and the laser machining unit 22. The control unit 24 controls the operation of the stage moving mechanism 42 of the moving unit 14 and the stage unit 16, relatively moves the workpiece 8 and the mechanical machining head 50, and relatively moves the workpiece 8 and the laser machining head 60. Further, the control unit 24 controls the driving of the mechanical machining unit 20 and the laser machining unit 22 to control the mechanical machining and the laser machining.

Figure 9:
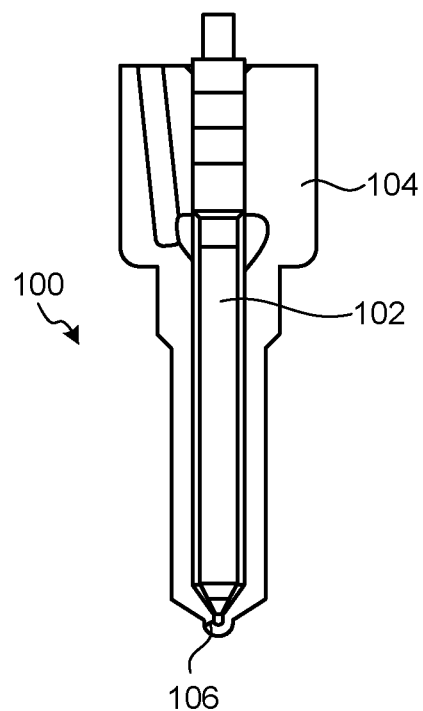
FIG. 9 is a schematic diagram illustrating a schematic configuration of an injector.
Figure 10A:
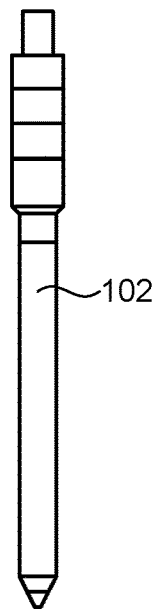
FIG. 10A is a schematic diagram illustrating a schematic configuration of a needle.
Figure 10B:
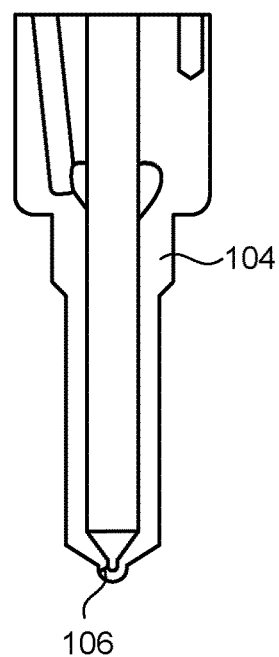
FIG. 10B is a schematic diagram illustrating a schematic configuration of a nozzle body.
Figure 10C:
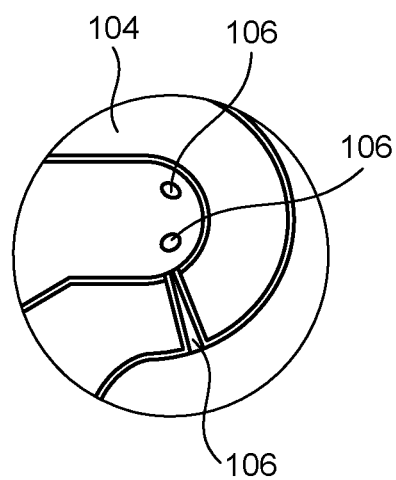
FIG. 10C is an enlarged view of the nozzle body.
Figure 11:
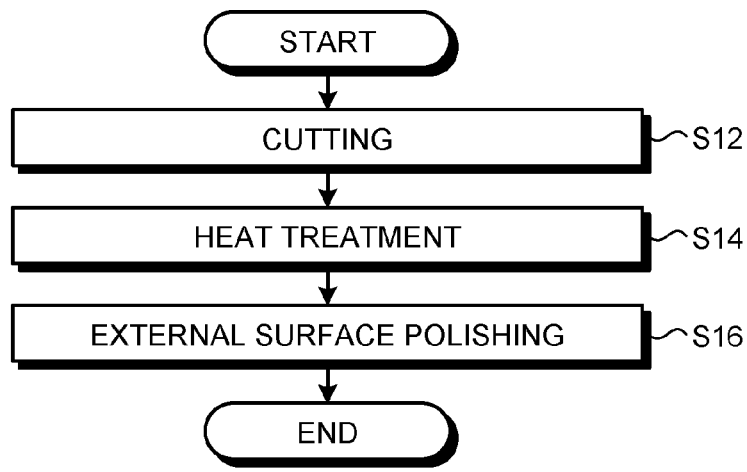
FIG. 11 is a flowchart illustrating an example of a method for manufacturing a needle.
Figure 12:
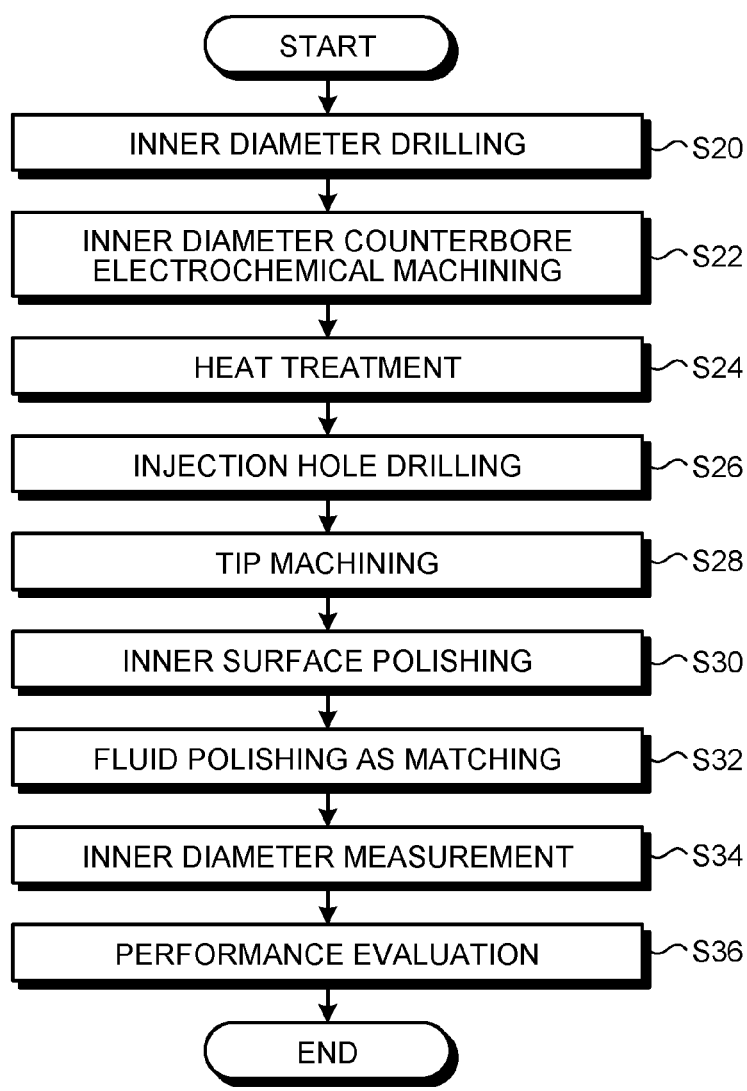
FIG. 12 is a flowchart illustrating an example of a method for manufacturing the nozzle body.
Figure 17:
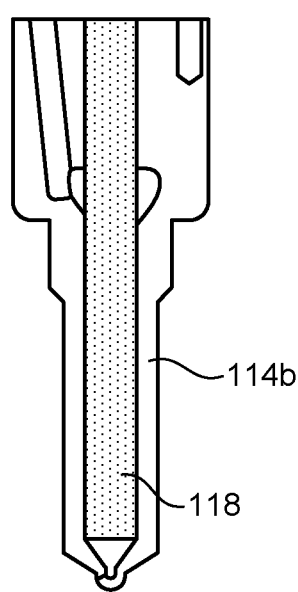
FIG. 17 is an explanatory diagram illustrating the operation of the combined machining apparatus.
Figure 18:
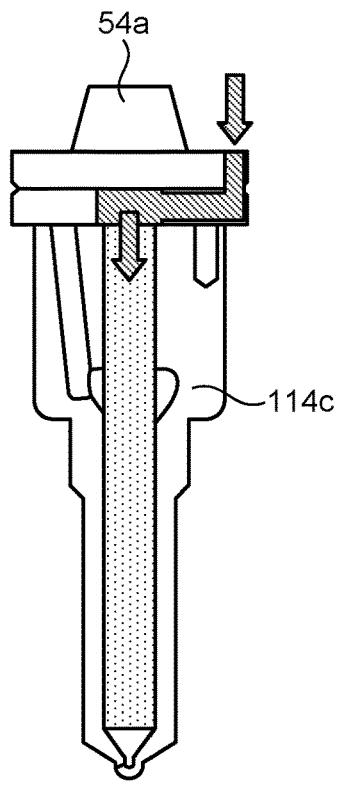
FIG. 18 is an explanatory diagram illustrating the operation of the combined machining apparatus.
Figure 19:
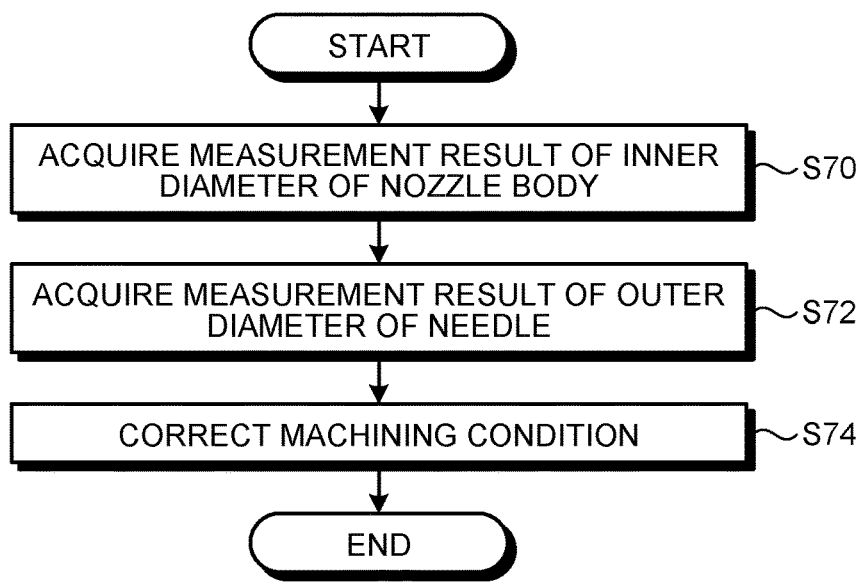
FIG. 19 is a flowchart illustrating the operation of the combined machining apparatus.

Next, an example of the operation of the combined machining apparatus 10, that is, a combined machining method will be described with reference to FIGS. 9 to 19. FIG. 9 is a schematic diagram illustrating a schematic configuration of an injector. FIG. 10A is a schematic diagram illustrating a schematic configuration of a needle. FIG. 10B is a schematic diagram illustrating a schematic configuration of a nozzle body. FIG. 10C is an enlarged view of the nozzle body. FIG. 11 is a flowchart illustrating an example of a method for manufacturing a needle. FIG. 12 is a flowchart illustrating an example of a method for manufacturing a nozzle body. FIGS. 13 to 18 are explanatory diagrams illustrating the operation of the combined machining apparatus. FIG. 19 is a flowchart illustrating the operation of the combined machining apparatus.

In this embodiment, the case of manufacturing the injector 100 illustrated in FIG. 9 using the combined machining apparatus 10 will be described. Further, the injector 100 is manufactured by the machining using the combined machining apparatus 10 and the machining using other various machining apparatuses. The injector 100 is a device that injects a fluid at a predetermined pressure or higher, and is used as a fuel injection mechanism of an internal combustion engine such as a diesel engine. The injector 100 has a needle 102 and a nozzle body 104. In the injector 100, the needle 102 is inserted into a hollow portion of the nozzle body 104. As illustrated in FIG. 10A, the needle 102 is an elongated rod-like member. As illustrated in FIGS. 10B and 10C, the hollow portion is formed inside the nozzle body 104, and a plurality of injection holes 106 with a diameter smaller than the diameter of the hollow portion is formed at the tip. The injection hole 106 is a hole that penetrates from the outside to the hollow portion. The combined machining apparatus 10 of this embodiment can be used in the manufacture of the nozzle body 104.

First, a method for manufacturing the needle will be described referring to FIG. 11. The method for manufacturing the needle performs cutting on the rod-like member (step S12), forms an external shape of the needle, performs the heat treatment (step S14), and performs polishing of the external surface as finishing (step S16). Further, the manufacturing method measures the external shape of the manufactured needle, in particular, the outer diameter near the tip. Further, the needle may be manufactured by an apparatus other than the combined machining apparatus 10.

Next, a method for manufacturing the nozzle body will be described with reference to FIGS. 12 to 18. First, in the method for manufacturing the nozzle body, a workpiece having an external shape to be a shape of the nozzle body is manufactured by casting or the like. The manufacturing method performs an inner diameter drilling on the manufactured member (step S20), forms an internal space, thereafter, performs an inner diameter counterbore electrochemical machining of the workpiece (step S22), and performs the heat treatment (step S24). The method for manufacturing the nozzle body fixes the workpiece subjected to the heat treatment to the stage 44, and machines the workpiece by the combined machining apparatus 10.

Figure 13:
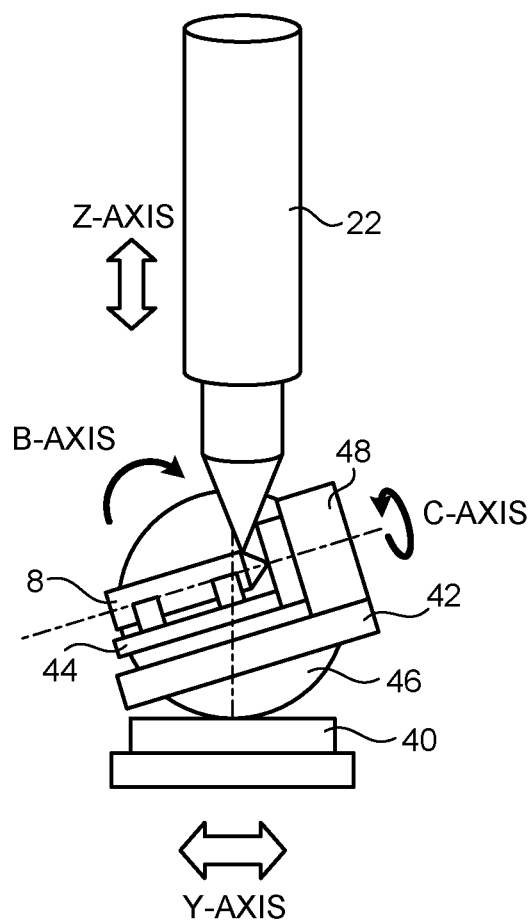
FIG. 13 is an explanatory diagram illustrating the operation of the combined machining apparatus.
Figure 14:
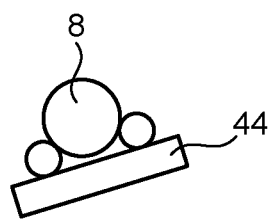
FIG. 14 is an explanatory diagram illustrating the operation of the combined machining apparatus.

The combined machining apparatus 10 performs the laser machining by the laser machining head 60 to form the injection hole on a fixed workpiece (step S26). Specifically, as illustrated in FIG. 13, the direction of the workpiece is adjusted by the stage moving mechanism 42 to move the workpiece in a direction in which the portion forming the injection hole of the workpiece is located on the upper side in the Z-axis direction than the end portion of the opposite side, and in a direction in which the center of the injection hole to be formed is parallel to the Z-axis direction, and the laser machining is performed by the laser machining head 60, thereby forming the injection hole on the workpiece. Furthermore, as illustrated in FIG. 14, the combined machining apparatus 10 can rotate the workpiece 8 around the axis in the longitudinal direction, by rotating the stage 44 around the C-axis using the C-axis rotating mechanism 48. The combined machining apparatus 10 rotates the stage 44 around the C-axis using the C-axis rotating mechanism 48, rotates the workpiece 8 at a predetermined angle, and performs the laser machining using the laser machining head 60, thereby forming the injection holes at a plurality of locations. The combined machining apparatus 10 can form the injection holes on the concentric circle by rotating the stage 44 around the C-axis using the C-axis rotating mechanism 48 to form the injection holes on the workpiece 8.

Figure 15:
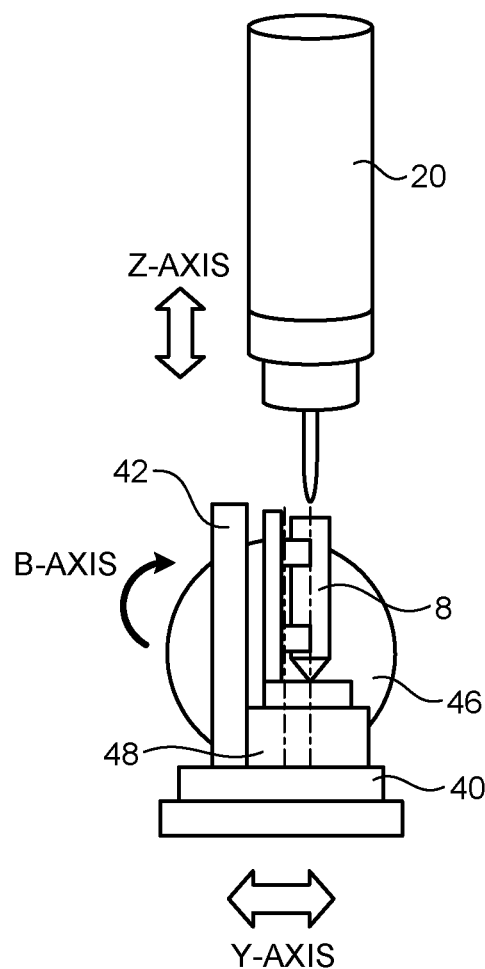
FIG. 15 is an explanatory diagram illustrating the operation of the combined machining apparatus.
Figure 16:
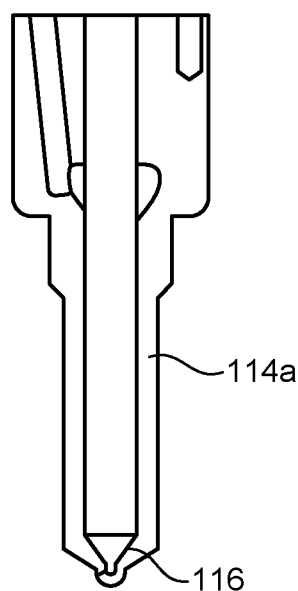
FIG. 16 is an explanatory diagram illustrating the operation of the combined machining apparatus.

The combined machining apparatus 10 performs the tip machining using the mechanical machining head 50 (step S28), after forming the injection holes. Specifically, as illustrated in FIG. 15, the direction of the workpiece 8 is adjusted by the stage moving mechanism 42, and the workpiece is moved in a direction in which the center axis of the hollow portion (axis that is parallel to the longitudinal direction and passes through the center of the cross-section) of the workpiece is parallel to the Z-axis direction. Thereafter, the combined machining apparatus 10 mounts the tool 56*a* to the head main body 54, inserts the tool 56*a* into the hollow portion, and polishes the tip portion of the hollow portion by the grinding wheel surface 58*a*. Further, the head main body 54 can perform polishing, for example, by rotating the tool 56*a* about the center axis of the hollow portion. Thus, as illustrated in FIG. 16, the tip 116 of the hollow portion of the workpiece 114*a*, that is, the tip 116 as a peripheral portion of the portion in which the injection hole 106 is formed is in a polished state.

The combined machining apparatus 10 performs the internal surface polishing after performing the tip machining (step S30). The combined machining apparatus 10 mounts the tool 56*b* to the head main body 54, inserts the tool 56*b* into the hollow portion, and polishes the inner circumferential surface of the hollow portion by the grinding wheel surface 58*b*. The head main body 54 can perform polishing, for example, by rotating the tool 56*b* around the center axis of the hollow portion. Thus, as illustrated in FIG. 17, the inner circumferential surface 118 of the hollow portion of the workpiece 114*b* is in a polished state.

The combined machining apparatus 10 performs fluid polishing as matching, after performing the internal surface polishing (step S32). Specifically, as illustrated in FIG. 18, the combined machining apparatus 10 mounts the tool on the head main body 54, supplies the polishing fluid to the hollow portion of the workpiece 114*c*, and polishes the internal surface, thereby performing the finishing of the internal surface.

The combined machining apparatus 10 measures the inner diameter, after performing the fluid polishing as the matching (step S34). The manufacturing method detaches the workpiece (nozzle body) from the combined machining apparatus 10 after measuring the inner diameter, evaluates the performance (step S36), and terminates the processing. When the performance evaluation is performed, the nozzle body that does not satisfy the required performance is excluded as a defective product, and thus, it is possible to manufacture an injector that satisfies the performance. The needle and the nozzle body manufactured as described above become an injector by inserting the needle into the nozzle body to perform other finishing.

The combined machining apparatus 10 can machine the workpiece 8 held on the stage 44 using both of the mechanical machining unit 20 and the laser machining unit 22. Thus, the machining can be performed, while maintaining the fixed state of the workpiece 8, and it is possible to suppress an occurrence of axial misalignment between the laser-machined portion and the mechanical-machined portion. Further, it is possible to effectively perform the laser machining by rotating the laser.

The combined machining apparatus 10 is provided with the fiber laser beam source 62 and the pulse laser beam source 64, and by allowing the switching of the irradiated laser using the switching mechanism 74, it is possible to switch laser to be used, depending on the size, the thickness, the material or the like of the workpiece. Thus, the machining can be performed with high accuracy and in a short time depending on the applications.

Further, by providing the combined machining apparatus 10 as a mechanism capable of rotating the workpiece 8 about orthogonal two axes using the stage moving mechanism 42, it is possible to machine the workpiece 8 in various directions, while maintaining the state of holding the workpiece 8 at the same stage 44.

The combined machining apparatus 10 preferably corrects (modifies) the machining conditions based on the information of the manufactured needle and nozzle body. As illustrated in FIG. 19, the combined machining apparatus 10 acquires the measurement result of the inner diameter of the nozzle body (step S70), acquires the measurement result of the outer diameter of the needle (step S72), corrects the machining conditions based on a comparison of the measurement results (step S74), and terminates the process. Specifically, the amount of cutting and the amount of polishing at each step are adjusted so that it is possible to reduce the time or the number of processes required for the polishing process prior to the finishing. This makes it possible to reduce the time required for the manufacturing, and makes it possible to further reduce load required for the tool.

Here, as the workpiece 8, various members other than the nozzle body can be adopted. Further, it is also possible to use various materials as the material of the workpiece 8, and it is possible to use, for example, members made of Inconel (registered trademark), Hastelloy (registered trademark), stainless steel, ceramic, steel, carbon steel, heat-resistant steel, ceramics, silicon, titanium, tungsten, resin, plastic, a Ni-base heat-resistant alloy or the like. Further, as the workpiece 8, it is also possible to use members made of a fiber reinforced plastic such as carbon fiber reinforced plastics (CFRP), glass fiber reinforced plastics (GFRP) and glass-mat reinforced thermoplastics (GMT), various types of metal such as an iron alloy and an aluminum alloy other than a steel plate, and various composite materials.

Further, in the above embodiment, although the workpiece 8 is moved in the Y-axis direction and the mechanical machining head 50 and the laser machining head 60 are moved in the X-axis direction and in the Z-axis direction by the moving unit 14, the embodiment is not limited thereto. The combined machining apparatus 10 may move the workpiece 8 in three directions of the X-axis, the Y-axis and the Z-axis and may move the mechanical machining head 50 and the laser machining head 60 in the three directions of the X-axis, the Y-axis and the Z-axis. Further, in this embodiment, although the posture (the direction and the rotational direction position) of the workpiece 8 is adjusted by the stage moving mechanism 42, the postures of the mechanical machining head 50 and the laser machining head 60 may also be adjusted.

REFERENCE SIGNS LIST

8 WORKPIECE
10 COMBINED MACHINING APPARATUS
12 FRAME
14 MOVING UNIT
16 STAGE UNIT
20 MECHANICAL MACHINING UNIT
22 LASER MACHINING UNIT
24 CONTROL UNIT
30 Y-AXIS MOVING MECHANISM

32 FIRST X-AXIS MOVING MECHANISM
34 SECOND X-AXIS MOVING MECHANISM
36 FIRST Z-AXIS MOVING MECHANISM
38 SECOND Z-AXIS MOVING MECHANISM
40 SUPPORT BASE
42 STAGE MOVING MECHANISM
44 STAGE
46 B-AXIS ROTATING MECHANISM
48 C-AXIS ROTATING MECHANISM
50 MECHANICAL MACHINING HEAD
52 TOOL EXCHANGE UNIT
54 HEAD MAIN BODY
56, 56a, 56b, 56c TOOL
58a, 58b GRINDING WHEEL SURFACE
60 LASER MACHINING HEAD
62 FIBER LASER BEAM SOURCE
64 PULSE LASER BEAM SOURCE

The invention claimed is:

1. A combined machining apparatus comprising:
a stage unit that includes a stage configured to support a workpiece;
a mechanical machining unit that includes a mechanical machining head having a tool configured to machine the workpiece;
a laser machining unit that includes a laser machining head configured to emit laser for machining the workpiece;
a moving unit that includes a Y-axis moving mechanism, a first X-axis moving mechanism, a second X-axis moving mechanism, a first Z-axis moving mechanism and a second Z-axis moving mechanism, the Y-axis moving mechanism relatively moving, with respect to the workpiece, the laser machining head, the mechanical machining head and the stage in a Y-axis direction, the first X-axis moving mechanism being fixed to the Y-axis moving mechanism to relatively move, with respect to the workpiece, the mechanical machining head in an X-axis direction orthogonal to the Y-axis direction, the second X-axis moving mechanism being fixed to the Y-axis moving mechanism to relatively move, with respect to the workpiece, the laser machining head in the X-axis direction, the first Z-axis moving mechanism being fixed to the first X-axis moving mechanism to relatively move, with respect to the workpiece, the mechanical machining head in a Z-axis direction orthogonal to the Y-axis direction and the X-axis direction, and the second Z-axis moving mechanism being fixed to the second X-axis moving mechanism to relatively move the laser machining head in the Z-axis direction; and
a control unit that controls the operation of each unit,
wherein the laser machining head has a laser turning unit that turns the laser relative to the workpiece, and a condensing optical system that condenses the laser turned by the laser turning unit, and a position at which the workpiece is irradiated with the laser is rotated by the laser turning unit, and
the laser machining unit includes,
a fiber laser beam source that outputs a fiber laser,
a pulse laser beam source that outputs a pulse laser, and
a switching mechanism that switches a state of making the fiber laser incident on the laser turning unit, and a state of making the pulse laser incident on the laser turning unit.

2. The combined machining apparatus according to claim 1, wherein the first X-axis moving mechanism moves along the same guide member as the second X-axis moving mechanism.

3. The combined machining apparatus according to claim 1, wherein the mechanical machining unit has a tool exchange unit that holds at least one tool in a movement area of the mechanical machining head, and
the control unit moves the mechanical machining head to a position facing the tool exchange unit using the first X-axis moving mechanism and the first Z-axis moving mechanism, and exchanges the tool mounted on the mechanical machining head using the tool exchange unit.

4. The combined machining apparatus according to claim 1, wherein the mechanical machining unit includes at least one tool that polishes the workpiece, and
the mechanical machining head polishes the workpiece by rotating the tool that polishes the workpiece.

5. The combined machining apparatus according to claim 1, wherein
the Y-axis moving mechanism has a first rail extending in the Y-axis direction,
the first and second X-axis moving mechanisms have a second rail extending in the X-axis direction, and
a horizontal plane is an X-Y plane including the X-axis direction and the Y-axis direction orthogonal to the X-axis direction, and a direction orthogonal to the horizontal plane is the Z-axis direction.

6. The combined machining apparatus according to claim 1, wherein the stage unit further has a stage moving mechanism that moves the stage, and
the control unit changes a posture of the workpiece by the stage moving mechanism.

7. The combined machining apparatus according to claim 6, wherein the stage moving mechanism includes at least one mechanism that rotates the stage around orthogonal two axes.

8. A combined machining method for machining a workpiece, using a mechanical machining head having a tool configured to machine the workpiece, and a laser machining head included in a laser machining unit configured to emit laser for machining the workpiece, the method comprising:
laser machining the workpiece by irradiating the workpiece with laser, after adjusting a posture of the workpiece;
moving the laser machining head and the mechanical machining head and moving the mechanical machining head to a position of machining the workpiece; and
mechanically machining the workpiece, after adjusting the posture of the workpiece, wherein
the laser machining head has a laser turning unit that turns the laser relative to the workpiece, and a condensing optical system that condenses the laser turned by the laser tuning unit, and a position at which the workpiece is irradiated with the laser is rotated by the laser turning unit, and
the laser machining unit includes,
a fiber laser beam source that outputs a fiber laser,
a pulse laser beam source that outputs a pulse laser, and
a switching mechanism that switches a state of making the fiber laser incident on the laser turning unit, and a state of making the pulse laser incident on the laser turning unit.

9. The combined machining method according to claim 8, wherein the workpiece is a nozzle body of an injector, an injection hole of the nozzle body is formed in the laser machining, and an internal surface of the nozzle body is polished in the mechanical machining.

* * * * *